(12) United States Patent
Bertram et al.

(10) Patent No.: US 6,757,681 B1
(45) Date of Patent: Jun. 29, 2004

(54) METHOD AND SYSTEM FOR PROVIDING PERFORMANCE DATA

(75) Inventors: Randal Lee Bertram, Raleigh, NC (US); Margherita LaFauci, Holly Springs, NC (US); Dawn Ashley Comfort, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,109

(22) Filed: Jun. 2, 1998

(51) Int. Cl.[7] .............................................. G06F 17/00
(52) U.S. Cl. .......................... 707/10; 209/200; 707/102
(58) Field of Search .......................... 395/200, 54, 600; 709/100–332; 379/106; 707/1–206

(56) References Cited

U.S. PATENT DOCUMENTS

| | | | | |
|---|---|---|---|---|
| 5,491,791 A | | 2/1996 | Glowny et al. | 395/183.13 |
| 5,610,915 A | | 3/1997 | Elliott et al. | 370/259 |
| 5,652,842 A | | 7/1997 | Siegrist, Jr. et al. | 395/202 |
| 5,657,252 A | | 8/1997 | George | 364/550 |
| 5,664,106 A | * | 9/1997 | Caccavale | 395/200 |
| 5,684,945 A | * | 11/1997 | Chen et al. | 395/182 |
| 5,704,366 A | | 1/1998 | Tacklind et al. | 128/716 |
| 5,706,435 A | | 1/1998 | Barbara et al. | 395/200.09 |
| 5,751,964 A | * | 5/1998 | Ordanic et al. | 709/224 |
| 5,781,703 A | * | 7/1998 | Desai et al. | 395/54 |
| 5,809,238 A | * | 9/1998 | Greenblatt et al. | 395/200 |
| 5,819,033 A | * | 10/1998 | Caccavale | 395/200 |
| 5,884,072 A | * | 3/1999 | Rasmussen | 395/600 |
| 6,643,635 B2 | * | 11/2003 | Nwabueze | 707/2 |
| 6,643,661 B2 | * | 11/2003 | Polizzi et al. | 707/100 |
| 6,647,400 B1 | * | 11/2003 | Moran | 707/205 |

OTHER PUBLICATIONS

Vanier et al., Aging, warm–up time and retrace: important characteristics of standard frequency generators (Proposal for IEEE Standards Project P1193), Frequency Control Symposium, 1992, 46th, Proceedings of the 1992 IEEE, May 27–29, 1992, pp. 807–815.*

Farrell, A production performance database and query software for integrated circuit manufacturing, Semiconductor Manufacturing Science Symposium, 1990, ISMSS 1990, IEEE/.SEMI International, May 21–23, 1990, pp. 39–43.*

Pinchera et al., A real time data acquisition and monitor system for integrated circuit visual inspection, Electronic Manufacturing Technology Symposium, 1989, Proceedings, Seventh EEE/CHMT International, Sep. 25–27, 1989, pp. 88–95.*

* cited by examiner

*Primary Examiner*—David Jung
(74) *Attorney, Agent, or Firm*—Joscelyn G. Cockburn

(57) ABSTRACT

A system and method for requesting, providing, and displaying data relating to performance of a network is disclosed. In one aspect, the method and system include allowing a user to select the at least one system from which data is requested, identify at least one data type for which data is requested, select a sampling interval for sampling data for the at least one data type, and identify a time period for which data of the at least one data type is requested. In an second aspect, the method and system include receiving the request, retrieving at least one value for the at least one data type if the at least one data type is available on the at least one system, and calculating an average value for the sampling interval. The method and system include saving the average value for the sampling interval in a report and repeating the retrieving, calculating, and saving steps for each sampling interval in the time period. In a third aspect the method and system further include merging the report for each of the portion of the plurality of systems to provide a composite report. During the merge, differences in the reports are accounted for. In a fourth aspect, the method and system graphically display the data by plotting the at least one average value for the at least one data type of each of the portion of the plurality of systems.

44 Claims, 11 Drawing Sheets

METHOD AND SYSTEM FOR PROVIDING PERFORMANCE DATA

CROSS-REFERENCE TO RELATED APPLICATIONS

The present application is related to U.S. patent application Ser. No. 09/089,018 entitled "METHOD AND SYSTEM FOR REDUCING THE HORIZONTAL SPACE REQUIRED FOR DISPLAYING A COLUMN HEADING" filed on Jun. 2, 1998 and assigned to the assignee of the present application. The present application is also related to U.S. patent application Ser. No. 09/088,528 entitled "METHOD AND SYSTEM FOR GRAPHICALLY DISPLAYING TREND AND RANGE DATA FOR A VARIETY OF SYSTEMS" filed on Jun. 2, 1998 and assigned to the assignee of the present invention. Applicant hereby incorporates by reference the above-mentioned co-pending patent applications.

FIELD OF THE INVENTION

The present invention relates to capacity management on a network and more particularly to a method and system for reducing the size of reports generated in order to describe the performance of a particular system in the network.

BACKGROUND OF THE INVENTION

Capacity management is of increasing interest for a network containing a plurality of systems. Capacity management refers to the monitoring of and upkeep of systems in a network and the network as a whole. The network may contain servers, computer systems for individual users of the network, mainframes, printers, or other systems. Depending on the size of the network, the network could be made up of only a few systems or thousands of systems. A user known as a network administrator is typically responsible for ensuring that individual portions of the network function and that the network as a whole functions.

In order to ensure that the network functions, a user can examine performance data for the systems in the network. In particular, a user such as a network administrator keeps track of monitors for each system. A monitor is an attribute of a particular system. For example, monitors include central processing unit ("CPU") utilization, disk space available, disk work load, the number of bytes sent by the system, and the number of bytes received by the system. Typically, the monitors of each system vary over time.

Previously, the user employed a mainframe for capacity management. More recently, conventional applications which allow a user to perform capacity management without requiring a mainframe have been developed. Such conventional applications allow to a user employ a system in the network to query the systems within the network and receive information relating to each system's monitors. A user receives information relating to performance data by requesting performance data from selected systems. Typically, a user formulates such a conventional request by including the type of data in which the user is interested and the time period over which the user wishes to receive data. For example, the type of data requested could include a variety of monitors. The time period for which a user wishes to receive data is typically a day, a week, or a month. The conventional request is then sent from the user's system to those systems in the network from which the user desires data.

In response to the conventional request, a conventional system generates a conventional report and sends the conventional report to the system of the user formulating the request. In order to be able to generate the conventional report, each system typically saves relating to certain monitors. Typically, data is saved at relatively short intervals, such as every minute or every five minutes. In order to allow a user to determine trends in performance of the system over time, this data is saved for a relatively long period of time, such as the previous day or month. When the conventional request for performance data is received, the system opens a file containing the performance data, selects the appropriate monitors, and writes the values of the monitors to the conventional report. The conventional report is then sent to the user's system. Once the user has the conventional reports from the selected systems available, the user can determine how the selected systems are performing and, therefore, how the network as a whole is performing.

Although conventional applications allow a user to examine performance data, a system interacting with such a conventional application may generate an extremely large report. For example, suppose the conventional systems save the values of their monitors every five minutes and the time period for which performance data is requested is a year. If the conventional request asks for data for a variety of monitors, then the report from a single conventional system could be several megabytes in length. A user may have requested the conventional report from several systems in the network. These conventional reports may take a great deal of time to send. The user's system may also wait for these conventional reports to be returned. Thus, system resources are tied up by the conventional reports. This problem is exacerbated if the reports are sent via the internet or other extended network.

Another problem is encountered once the reports reach the user's system. If a conventional composite report is generated on the user's system from conventional reports, the user's system may take a long time to generate the conventional composite report. Where the size of each conventional report is large, the delay in generating the conventional composite may be unacceptable. Moreover, both the conventional reports and the conventional composite report may require a great deal of space in order to be saved. This may also be unacceptable. Finally, if the user wishes to graphically display the contents of the report, a conventional application for graphically displaying data may require an inordinate amount of memory to function. This may also adversely affect system performance. Some of these issues may be overcome by storing data relating to the monitors only once per day on the user's system, rather than continuously on each system. However, in this case, the network is incapable of producing reports for a user at any given time. Thus, it may be difficult for a user to diagnose problems relating to a particular system or the network as a whole.

Accordingly, what is needed is a system and method for reducing the size of a report containing performance data without unduly sacrificing necessary information. The present invention addresses such a need.

SUMMARY OF THE INVENTION

The present invention provides a method and system for requesting, providing, and displaying data relating to performance of a network. In one aspect, the method and system comprise allowing a user to select the at least one system from which data is requested, identify at least one data type for which data is requested, select a sampling interval for sampling data of the at least one data type, and identify a time period for which data of the at least one data type is requested. In this aspect, the method and system may also comprise identifying an inclusion time specifying at least one interval within the time period for which data for the at least one data type is sampled. Also in this aspect, the method and system may also comprise requesting minimum and maximum data. In a second aspect, the method and system comprise receiving a request including the data discussed above. In this aspect, the method and system comprise retrieving at least one data point for the at least one data type if the at least one data type is available on the at least one system and calculating an average value for the sampling interval if there is more than one data point for the sampling interval. In this aspect, the method and system further include saving the average value for the sampling interval in a report and repeating the retrieving, calculating, and saving steps for each sampling interval in the time period. In this aspect, the method and system may also include performing the retrieving, calculating and saving steps only during the inclusion times within the time period. In this aspect, the method and system may also comprise saving minimum and maximum data if requested. In a third aspect the method and system further comprise providing a report including the data saved above for a portion of a plurality of systems on a network and merging the report for each of the portion of the plurality of systems to provide a composite report. When merging the reports, differences in the reports are accounted for. In a fourth aspect, the method and system graphically display the data by plotting at least one average value for each of the at least one data type of each of the portion of the plurality of systems. In this aspect, the method and system may also comprise plotting the minimum value and the maximum value for each average value. Also in this aspect, the method and system may also comprise plotting average values, minimum values and maximum values only for specified inclusion times.

According to the system and method disclosed herein, the present invention is capable of reducing the size of reports generated thereby increasing overall system performance and facilitating capacity management.

DETAILED DESCRIPTION OF THE INVENTION

The present invention relates to an improvement in requesting and providing reports such as those used in capacity management. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
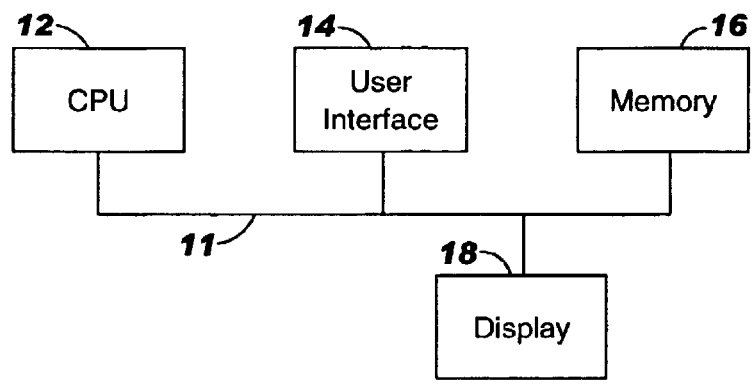
FIG. 1A is a block diagram of a computer system.

FIG. 1A is a block diagram of a computer system 10 in which the present invention can be used. The computer system 10 includes a central processing unit ("CPU") 12 coupled to a system bus 11. Also coupled to the system bus 11 are a user interface 14, a memory 16, and a display 18. Through the user interface 14, the user can input information to the computer system 10. The display 18 allows the user to view information, for example in graphical form.

Figure 1B:
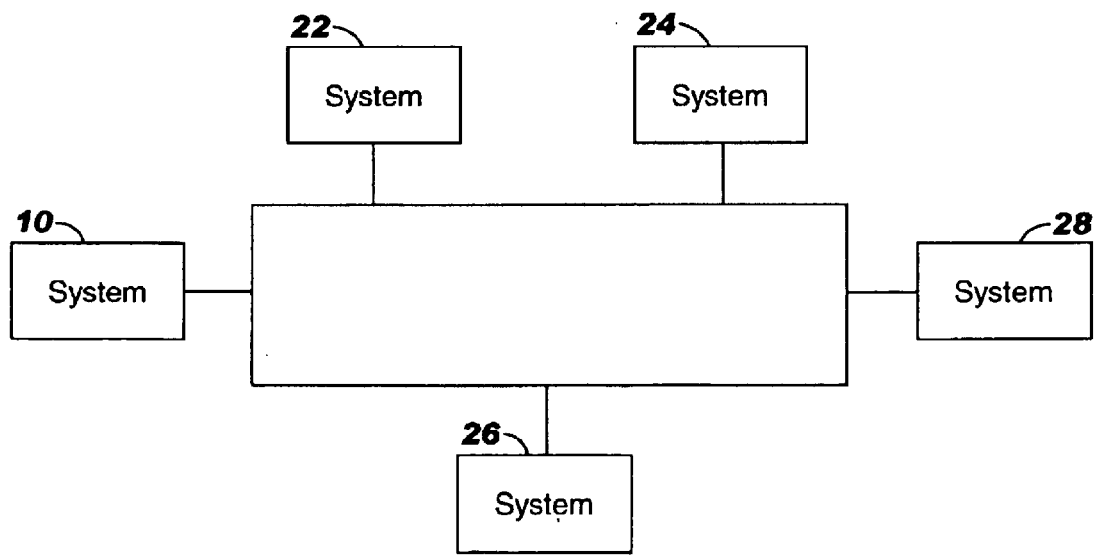
FIG. 1B is a block diagram of a network in which the computer system may reside.

FIG. 1B depicts a network 20 in which the computer system 10 might reside. The network 20 also includes systems 10, 22, 24, 26, and 28. The systems 22, 24, 26, and 28 could include other computer systems, servers, printers, or other apparatus. Although depicted as five systems 10, 22, 24, 26, and 28, the network 20 could include any number of systems, from one system to thousands of systems, or more.

Referring to FIGS. 1A and 1B, a user of the system 10 may wish to view performance data relating to the network 20 on the display 18. For example, capacity management is of increasing interest for a network containing a plurality of systems, such as the network 20. Capacity management allows a user, such as a network administrator, using the system 10 to monitor the network 20 and ensure that the network 20 functions properly. In order to ensure that the network 20 functions, the user keeps track of monitors for each system 10, 22, 24, 26, and 28. A monitor is an attribute of a particular system 10, 22, 24, 26, or 28. For example, monitors include CPU utilization, disk space available, the number of bytes sent by the system, and the number of bytes received by the system.

Figure 2:
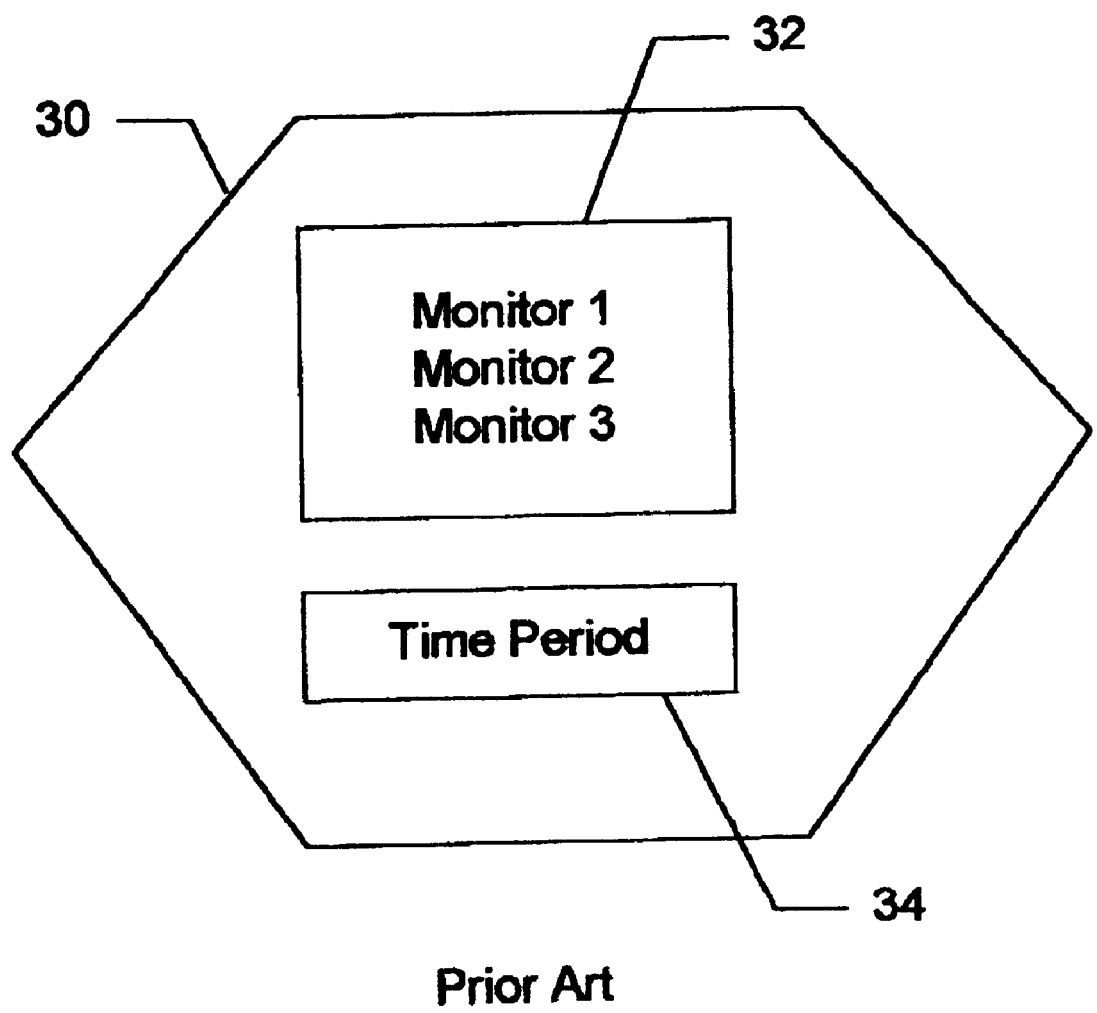
FIG. 2 is a block diagram depicting a conventional request.

Applications residing on a user's system 10, not shown, allow a user to query each system 10, 22, 24, 26, or 28 and receive performance data, information relating to each system's monitors. FIG. 2 depicts a conventional request 30 formulated by a user. The conventional request 30 includes monitors 32 and a time period 34. The conventional request identifies three monitors 32 for which the user wishes to receive information. For example, the monitor 1 might be CPU utilization, the monitor 2 might be disk space available, and the monitor 3 might be disk workload. However, the conventional request 30 could include another number of monitors or different monitors. The time period 34 indicates the time for which the user desires performance data. Typically, the time period 34 is a day, a week or a month. Typically, a system 10, 22, 24, 26, or 28 will generate performance data for the time period 34 previous to the current time. Although not shown in the conventional request 30, a user also typically selects which of the systems 10, 22, 24, 26, or 28 in the network for which the user desires performance data. The conventional request 30 is sent by the user's system 10 ("requesting system") to the systems 10, 22, 24, 26, or 28 selected. For ease of explanation, systems 22, 24, and 26 will be considered the selected systems.

In response to the conventional request 30, a selected system 22, 24, or 26 generates a conventional report including the performance data requested. In order to provide the user with the data requested, each system 10, 22, 24, 26, and 28 maintains a data file of the monitors. Preferably, this data is saved in one of two files. A first file retains data for approximately the previous thirty-six hours. In the first file, the values of the monitors are saved every minute. In a second file, data for approximately the previous month. In the second file, values of the monitors are saved every five minutes. Note, however, that another number of files may be maintained, or files having a different time or data saved at different intervals may be generated.

Figure 3:
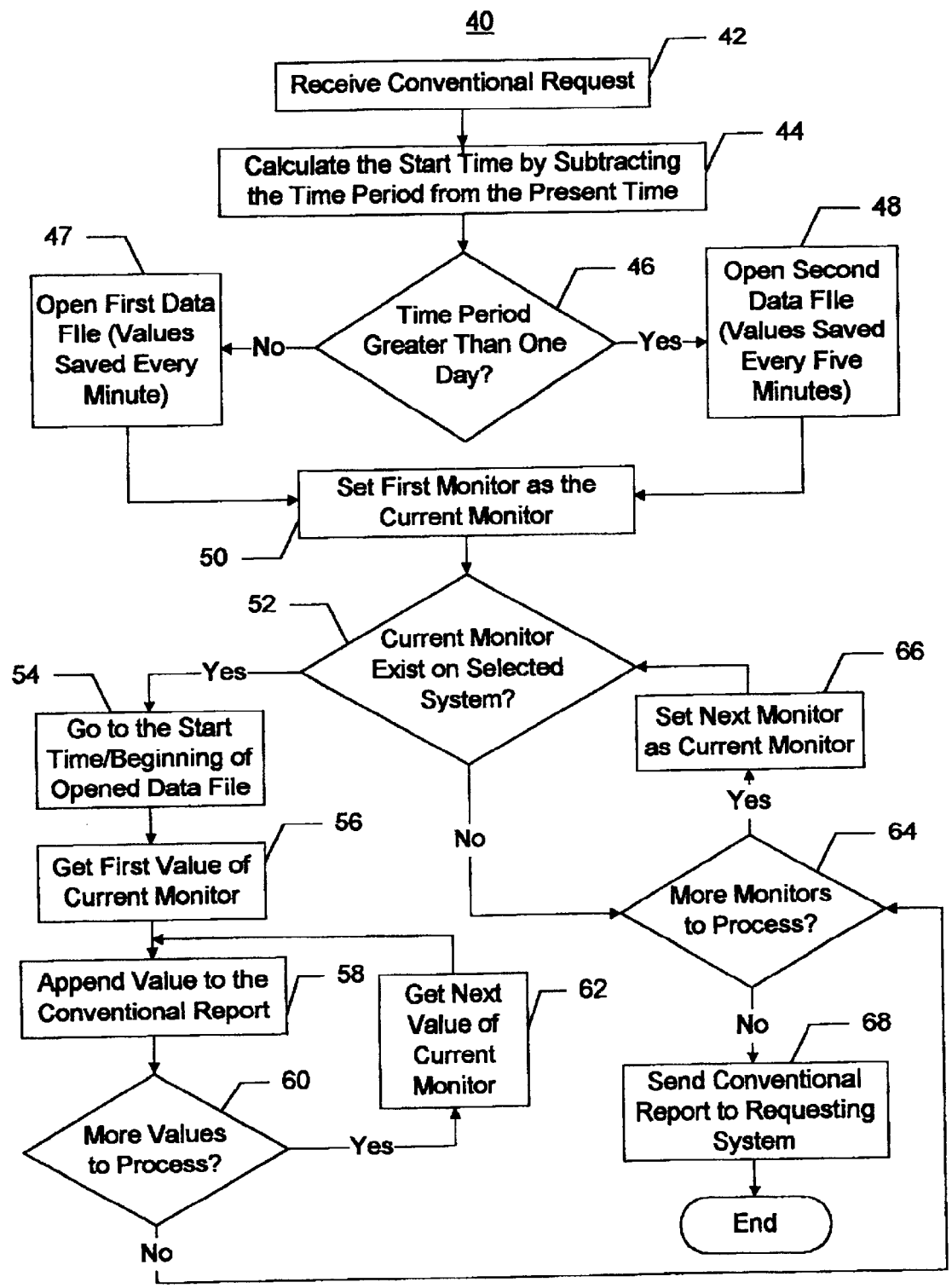
FIG. 3 is a flow chart of a conventional method for generating a conventional report in response to a conventional request.

FIG. 3 depicts a conventional method 40 which a selected system 22, 24, or 26 uses to generate the conventional report. The selected systems 22, 24, or 26 receives the conventional request via step 42. The selected system 22, 24, or 26 then calculates a start time by subtracting the time period 34 from the present time via step 44. The selected system 22, 24, or 26 then determines whether the time period 34 is greater than one day via step 46. Depending on the length of the time period, a different one of the first and second files, discussed above, is opened. If the time period 34 is not greater than one day, then via step 47 the first data file, which saves values of the monitors every minute, is opened via step 47. If the time period 34 is greater than one day, then via step 48 the second data file, which saves values of the monitors every five minutes, is opened via step 48.

The selected system 22, 24, or 26 then retrieves the first monitor as the current monitor via step 50. It is then determined via step 52 if the current monitor exists on the selected system 22, 24, or 26. If the monitor does not exist, then it is determined if there are more monitors to process via step 64. Steps 64, 66, 68, and 70 will be discussed more fully below.

If the monitor does exist on the selected system 22, 24, or 26, then the selected system 22, 24, or 26 goes to the start time via step 54. If the start time is before data in the opened file is saved, then the selected system 22, 24, or 26 goes to the beginning of the opened file in step 54. The first value of the current monitor is then retrieved via step 56. This value is then appended to the conventional report via step 58. It is then determined in step 60 if there are more values of the current monitor to process. If so, then the next value of the current monitor is retrieved via step 62. Steps 58, 60, and 62 are then repeated until all values of the current monitor are processed.

Once it is determined in step 60 that all values of current monitor are processed, then it is determined if there are more monitors in the conventional request 30 to process via step 64. This determination is also made if, in step 52, it was determined that the current monitor does not exist on the selected system 22, 24, or 26. If there are more monitors in the conventional request 30 to process, then in step 66 the next monitor is made the current monitor. Steps 52 through 66 are then repeated until all of the monitors in the conventional request 30 are processed. Once it is determined in step 64 that there are no more monitors in the conventional request 30 to process, the report is sent to the requesting system 10 via step 68. The method 40 then ends. As a result, the selected system 22, 24, or 26 provides a report including the requested performance data to a user at the requesting system 10.

Although the conventional request 30 and the method 40 shown in FIGS. 2 and 3 can provide a user with performance data, those with ordinary skill in the art will realize that the selected system 22, 24, or 26 may generate an extremely large conventional report in response to the conventional request 30. For example, suppose the time period for which performance data is requested is a year. Thus, the second data file having values of the monitor saved every five minutes is used. If the conventional request asks for data for a variety of monitors, then the report from one selected system 22, 24, or 26 could be several megabytes in length. A user may have requested the conventional report from several systems 10, 22, 24, 26, or 28 in the network 20. Because they are so large, these conventional reports may take a great deal of time to send. Thus, resources of the network 20 and the selected system 22, 24, or 26 may be tied up by the conventional reports. The requesting system 10 may also wait until the conventional reports are received. If the conventional reports are sent via the internet or other extended network, the time taken to send the report is further increased.

Another problem is encountered once the reports reach the requesting system 10. A user may wish to generate a conventional composite report from the conventional reports. If the conventional composite report is generated, the requesting system 10 may take a long time to generate the conventional composite report. Where the size of each conventional report is large, the delay in generating the conventional composite report may be unacceptable. Moreover, each conventional report provided by a selected system 22, 24, or 26 and the conventional composite report may require a great deal of space in order to be saved. This may also be unacceptable. If the user wishes to graphically display the contents of the report, a conventional application for graphically displaying data may require an inordinate amount of memory in order to display such a large amount of data. This may also adversely affect the performance of the requesting system 10. Some of these issues may be overcome by storing data relating to the monitors only once per day on the requesting system 10, rather than continuously on each system 10, 2, 24, 26, or 28. However, in this case, the systems 10, 22, 24, 26, or 28 are incapable of producing reports for a user at any given time. Thus, it may be difficult for a user to diagnose problems relating to a particular system 10, 22, 24, 26, or 28 or the network 20 as a whole.

The present invention provides for a method and system for generating a request and providing a report of performance data utilizing reduced space, merging such reports, and graphically displaying performance data in such a report. The present invention will be described in terms of a particular network having particular systems, particular forms of the request and particular monitors. However, one of ordinary skill in the art will readily recognize that this method and system will operate effectively for other types of networks, other types of monitors, other systems, and other types of requests. In addition, the present invention is described in the context of providing performance data for capacity management. However, the method and system could be used to provide data for other purposes.

Figure 4A:
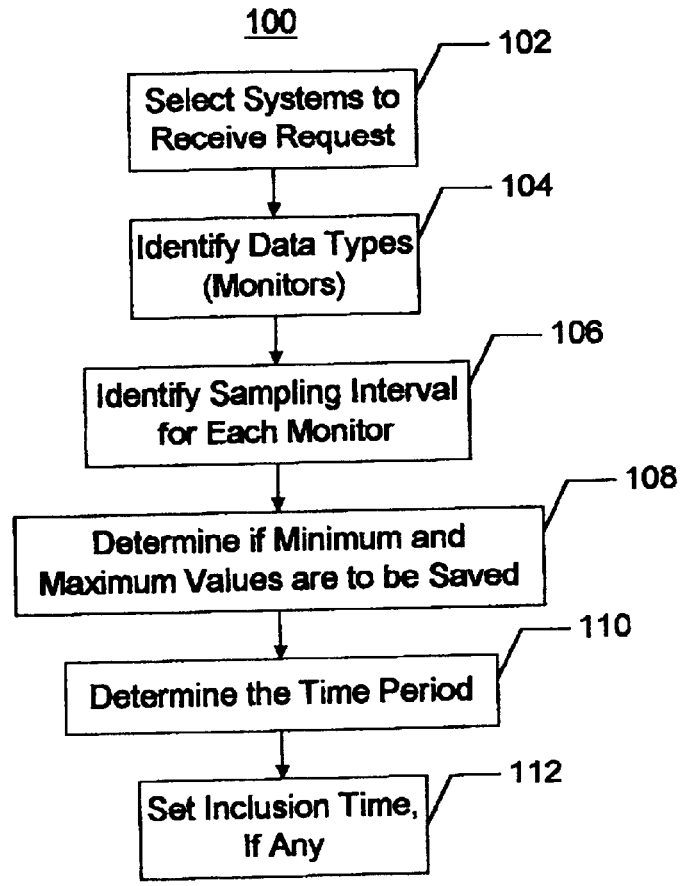
FIG. 4A is a flow chart depicting one embodiment of a method for generating the request in accordance with the present invention.

The method and system in accordance with the present invention are suitable for use with the system 10 and network 20 depicted in FIGS. 1A and 1B. To more particularly illustrate the method and system in accordance with the present invention, refer now to FIG. 4A depicting a flow chart of a method 100 for generating a request. The user selects the systems 10, 22, 24, 26 or 28 to receive the request via step 102. For ease of explanation, the systems 22, 24, and 26 are considered the selected systems. However, nothing prevents another number of the systems 10, 22, 24, 26, and 28 of different systems 10, 22, 24, 26, and 28 from being the selected systems. The user then identifies the data types for which data is to be saved via step 104. Thus, in one embodiment, the user identifies the monitors of interest via step 104. The user also identifies the sampling interval for each monitor via step 106. The user also determines if minimum and maximum values are to be saved for the monitor via step 108. In one embodiment, this includes determining whether to set as on a minimum/maximum data flag. The user also determines a time period for the request via step 110. The user also sets inclusion times, if any, via step 112.

Figure 4B:
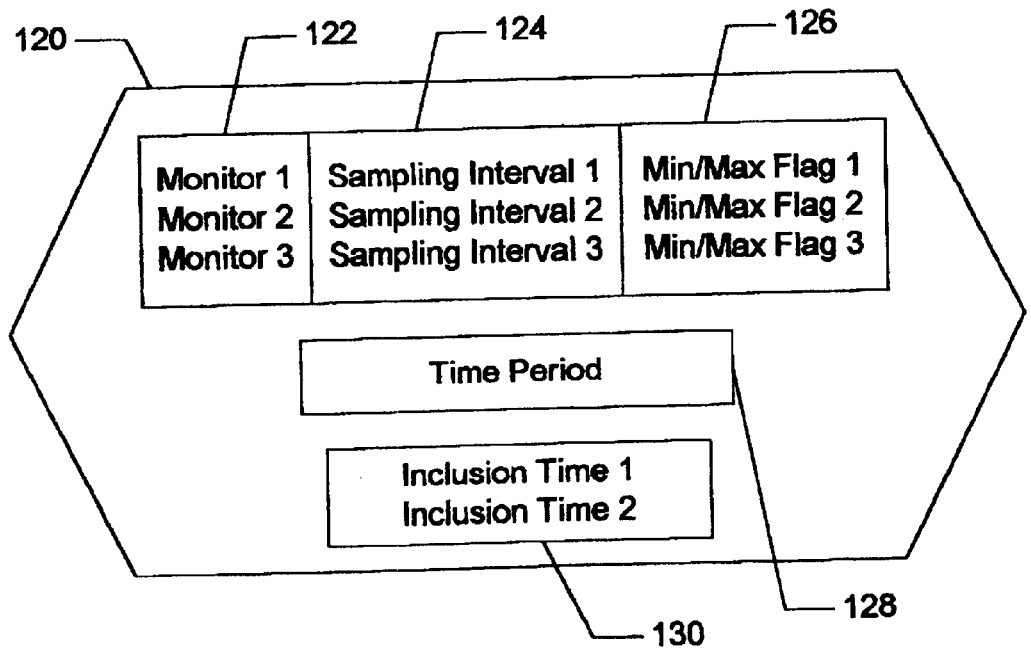
FIG. 4B is a block diagram of a request generated in accordance with the present invention.

FIG. 4B depicts a block diagram of one embodiment of request 120 generated in accordance with the method 100. The request 120 specifies types of data in which the user is interested. Thus, the request 120 includes monitors 122. The request 120 also includes sampling intervals 124 and minimum/maximum data flags 126 for the monitors 122. The request 120 also includes a time period 128 and inclusion times 130.

The sampling intervals 124 for each of the monitors 122 indicates the time interval between values saved in a report generated in accordance with the present invention. The sampling intervals 124 can be different from the intervals at which values are saved by the systems 10, 22, 24, 26, or 28 in the first file, the second file, or via another mechanism. For example, the sampling interval 124 may be one minute, five minutes, thirty minutes, one hour or one day, depending on how often the user desires data from the monitor 122. The inclusion times 130 indicate times within the time period 128 for which performance data is provided. The inclusion times 130 could be certain hours within a day or certain days within a week. Thus, the user can specify those times within the time period 128 for which the user desires performance data. For example, the inclusion times 130 could be from 8:00 A.M. to 12:00 P.M. and 1:00 P.M. to 5:00 P.M. Similarly, the inclusion times 130 could include only Monday through Friday. Thus, a user can ensure that data for peak hours will be provided within a report without generating a report that is too large in size. Although three monitors 122, three sampling intervals 124, and three minimum/maximum flags 126 are depicted, nothing prevents another number of monitors 122, another number of sampling intervals 124, and another number of minimum/maximum flags 126 from being used. Similarly, although two inclusion times 130 are shown, nothing prevents another number of inclusion times, including no inclusion times, from being specified.

Figure 5A:
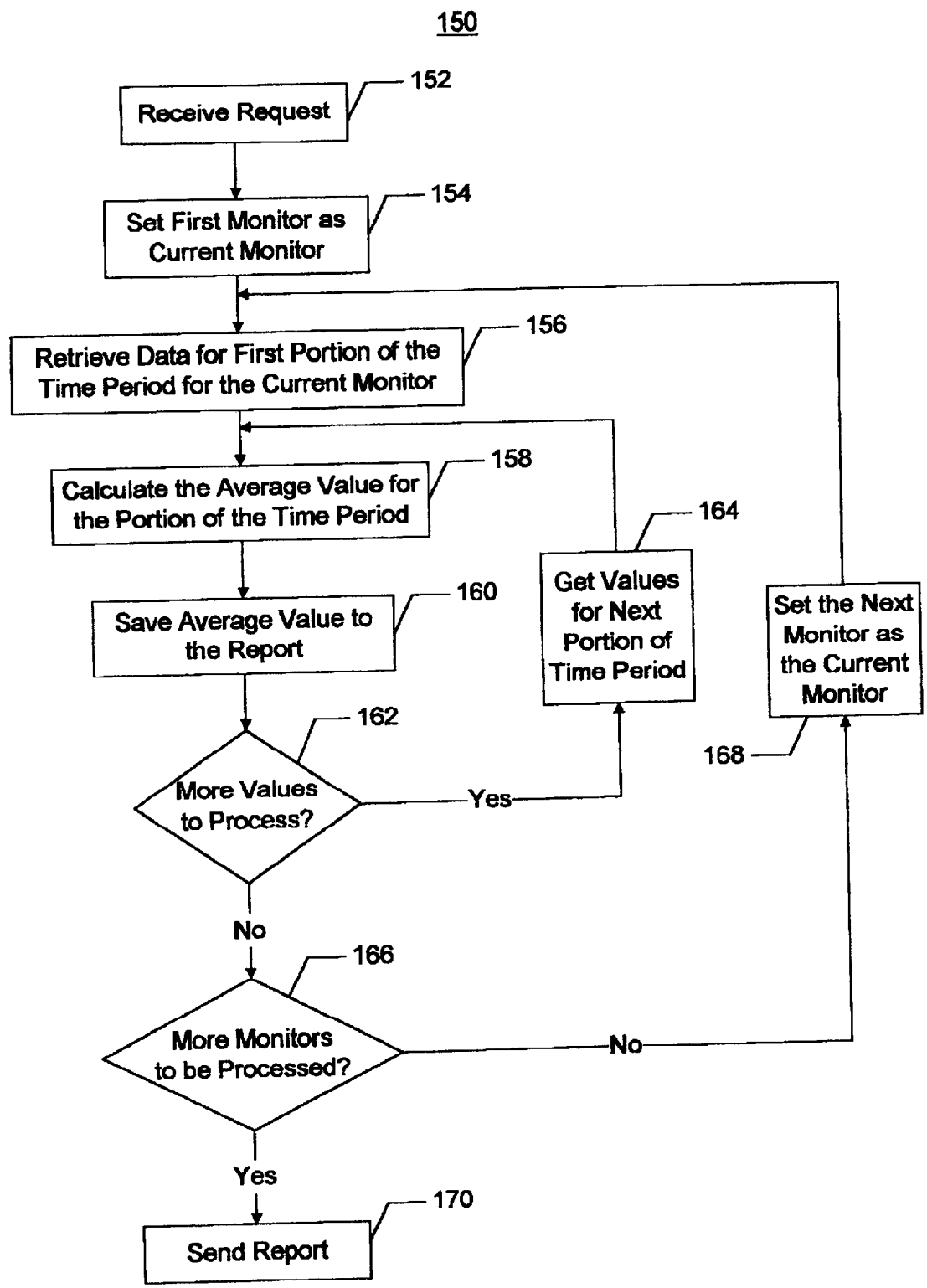
FIG. 5A is a high level flow chart depicting one embodiment of a method for generating a report in response to a request in accordance with the present invention.

FIG. 5A depicts a high level flow chart of a method 150 a selected system 22, 24, or 26 uses to generate a report in accordance with the present invention. The selected system 22, 24, or 26 receives the request 120 via step 152. The first monitor 122 is set as the current monitor via step 154. Data for the first monitor 122 for the portion of the time period 128 is retrieved via step 156. Preferably, the data for the first monitor 122 includes the values previously saved for the monitor 122 by the selected system 22, 24, or 26. In addition, each portion of the time period 128 has the same length as the sampling interval 124 for the monitor 122. An average value is then calculated for the portion of the time period 128 via step 158. Preferably, the average value is calculated by summing the values saved for the portion of the time period 128 and dividing by the number of values saved for the portion of the time period 128. The average value is then saved in the report via step 160. It is then determined if there are more values to process in the time period 128 via step 162. In one embodiment, this includes determining if there are more values to process within the inclusion times 130 in the time interval 128.

If there are more values to process, then the data for the next portion of the time period 128 is retrieved via step 164. Steps 158 through 164 are then repeated for each portion of the time period 128. When it is determined in step 162 that there are no more values to process, it is determined via step 166 whether there are more monitors 122 to be processed. If there are more monitors 122, then the next monitor is set as the current monitor via step 168. Steps 152 through 168 are then repeated until all monitors 122 in the request 120 have been processed. When it is determined that there are no more monitors to be processed, the report is sent via step 170.

Figure 5B:
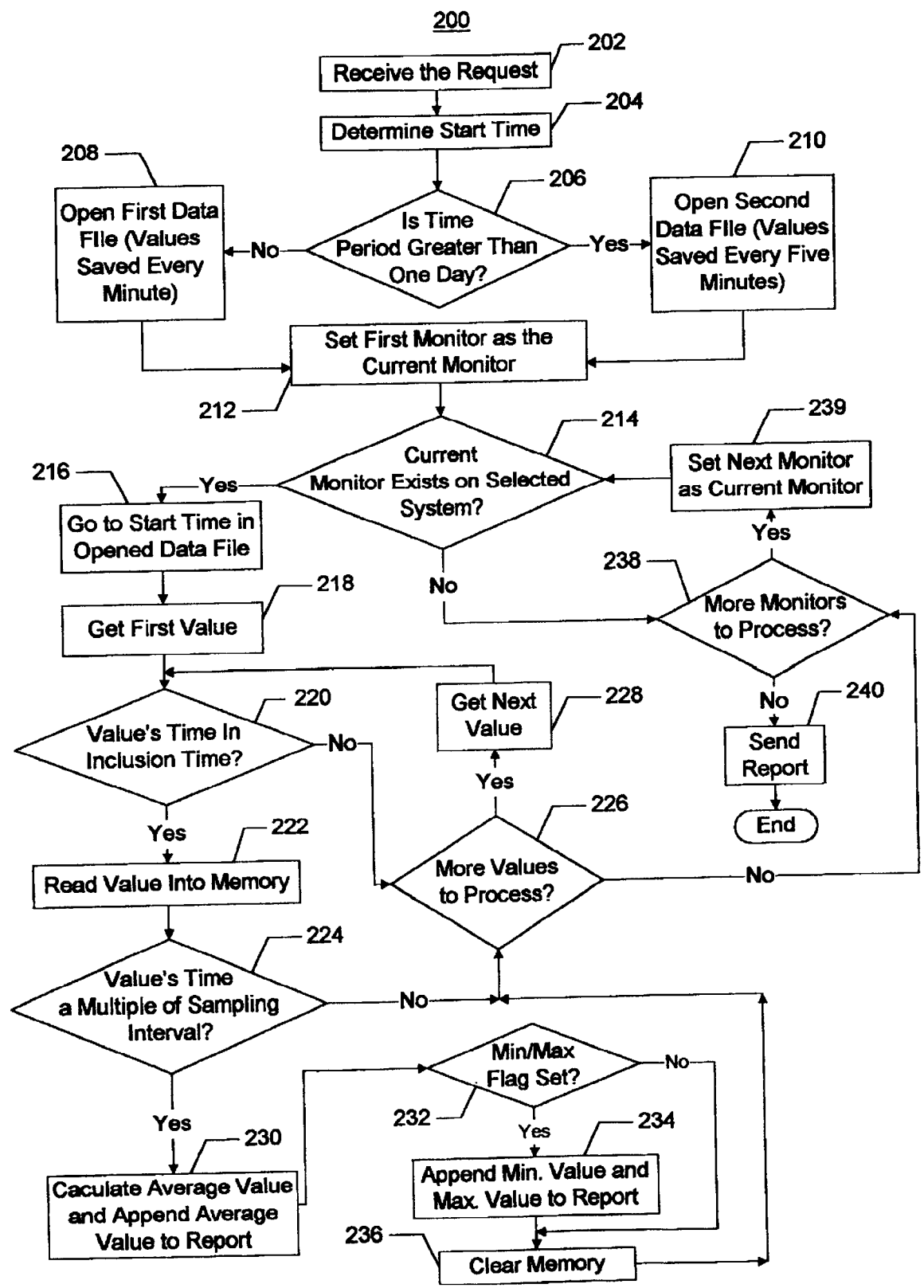
FIG. 5B is a more detailed flow chart depicting one embodiment of a method for generating a report in response to a request in accordance with the present invention.

FIG. 5B depicts a more detailed flow chart of a method 200 for generating a report in response to the request 120. The selected system 22, 24, or 26 receives the request 120 via step 202. The start time for the report is then determined via step 204. In a preferred embodiment, this is accomplished by subtracting the time period 128 from the present time.

It is then determined if the time period 128 for the request 120 is greater than one day via step 206. If the time period 128 is not greater than a day, then via step 208 the first data file, which stores values of the monitors every minute, is opened. If the time period 128 is greater than one day, then the second data file, which stores values of the monitors every five minutes, is opened via step 210. The first monitor 122 is then set as the current monitor via step 212.

It is then determined if the current monitor exists on the selected system 22, 24, or 26 via step 214. If the current monitor does not exist on the system, then step 238, discussed below, is performed. If the current monitor exists on the system, then via step 216 the selected system 22, 24, or 26 goes to the start time in the opened data file. In one embodiment, the selected system 22, 24, or 26 may go to the beginning of the opened data file in step 216 if the beginning of the opened data file is after the start time. The first value for the current monitor is then retrieved via step 218. It is then determined via step 220 if the value's time is within the inclusion time 130, if any, in the request 120. If the value's time is not within the inclusion time 130, then step 226, discussed below, is performed. If the value's time is within the inclusion time 130, then the value is read into the selected system's 22, 24, or 26 memory via step 222. Preferably, the values are saved in memory as an array.

It is then determined if the value's time is a multiple of the sampling interval 124 for the current monitor via step 224. If the value's time is a multiple of the sampling interval 124 then the values for this portion of the time period 128 have been retrieved. If the value's time is not a multiple of the sampling interval, then it is determine if there are more values to process via step 226. If there are no more values to process, then step 238, discussed below, is performed. If there are more values to process, then the next value for the current monitor is retrieved via step 228. The selected system 22, 24, or 26 then returns to the step 220.

If the value's time is a multiple of the sampling interval, then the average value is calculated from the values stored in memory and appended to the report via step 230. Thus, the average value is for a portion of the time period 128 having a length equal to the sampling interval. Preferably, the average value is calculated by summing the values stored in memory and dividing by the number of values stored in memory.

It is then determined whether minimum and maximum values have been requested for the monitor via step 232. In one embodiment, this includes determining if the minimum/maximum flag 126 has been set on for the current monitor in the request 120. If the minimum/maximum flag 126 is not set on, then the selected system 22, 24, or 26 clears the memory via step 236. If it is determined that the minimum/maximum flag 126 has been set on then the lowest and highest values from memory are appended to the report via step 234. The memory is then cleared via step 236. The selected system 22, 24, or 26 then returns to the step 226, determining if there are more values to process for the current monitor.

This process continues until there are no more values to process for the current monitor. When it is determined via step 226 that there are no more values to process for the current monitor, then the selected system 22, 24, or 26 determines whether there are more monitors 122 in the request 120 to process via step 238. If there are more monitors 122 in the request to process, then the selected system 22, 24, or 26 sets the next monitor 122 as the current monitor via step 239 and returns to the step 214. If there are no more monitors 122 in the request 120 to process, then the report is sent to the requesting system via step 240.

Figure 6:
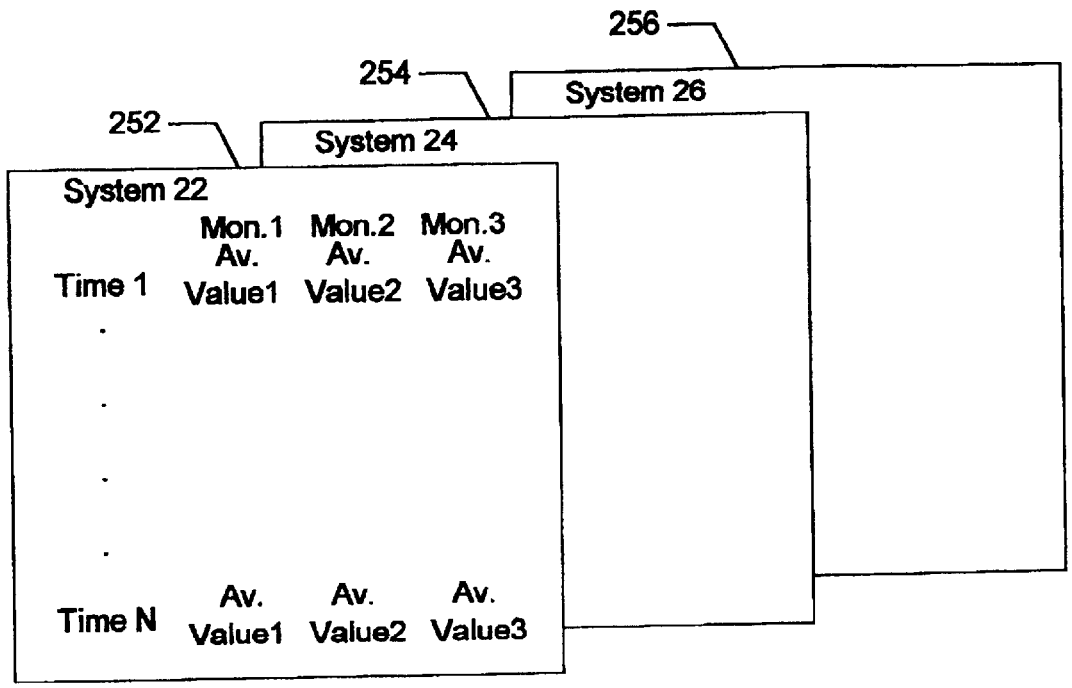
FIG. 6 depicts one embodiment of the reports generated in accordance with the present invention by three systems.

FIG. 6 depicts reports 252, 254, and 256 generated using the method 200 in response to the request 120. Each report 252, 254, and 256 indicates the selected system 22, 24, and 26, respectively, which generated the report 252, 254, and 256. In addition, each report 252, 254, and 256 indicates the times at which average values are saved and the average values for each monitor 122 at each time respectively. The times are spaced apart by the appropriate sampling intervals 124. If minimum and maximum values were requested in the request 120, the minimum and maximum values for the appropriate monitors 122 would also be present in the report.

Due to the information specified in the request 120, the selected system 22, 24, or 26 can generate smaller reports using a method in accordance with the present invention such as the method 150 or 200. Although the size of the request 120 is greater than the size of the conventional request 30, the difference in size is relatively insignificant. However, the reports 252, 254, and 256 may be significantly smaller than reports generated in response to the conventional request 30. Thus, each selected system 22, 24, or 26 generates a report 252, 254, or 256 in response to the request 120. Because the request 120 specifies the sampling interval 124 for each monitor 122, each report 252, 254, and 256 generated is not limited to the times at which the values are originally saved by the selected systems 22, 24, and 26. Instead, average values are provided, allowing the size of the report 252, 254, and 256 to be reduced. Moreover because the request 120 can specify that minimum and maximum data be saved, information important to determining if the selected system 22, 24, or 26 is performing adequately may not be lost. For example, because the maximum and minimum values may be provided, a user may still be able to determine if the selected system 22, 24, or 26 exceeds operating parameters even if the average value for a particular portion of the time period 128 does not exceed the operating parameters. In addition, because the request 120 can specify inclusion times 130, the size of each report 252, 254, and 256 generated by the selected systems 22, 24, or 26 can be further reduced. In particular, the report generated in response to the request 120 includes only data which falls within the inclusion times 130. Thus, a user can not only specify a time period 128, but a user can also indicate inclusion times 130 within the time period that are of interest.

Reports 252, 254, and 256 can be more rapidly generated and sent from the selected systems 22, 24, and 26 to the requesting system 10 because the reports 252, 254, and 256 are smaller than reports generated in response to the conventional request 30. Thus, the reports 252, 254, and 256 consume fewer resources of the network 20. In addition, the user requesting the reports 252, 254, and 256 may not be required to wait for an unacceptable period of time before the reports 252, 254, and 256 are provided to the user's system 10. Moreover, the reports 252, 254, and 256 can be stored more easily on the requesting system 10 for the user. These benefits can be achieved while retaining information the user deems important, such as minimum and maximum values of a monitor 122 and specific inclusion times 130 within the time period 128. Thus, capacity management in the network 20 is facilitated.

Figure 7A:
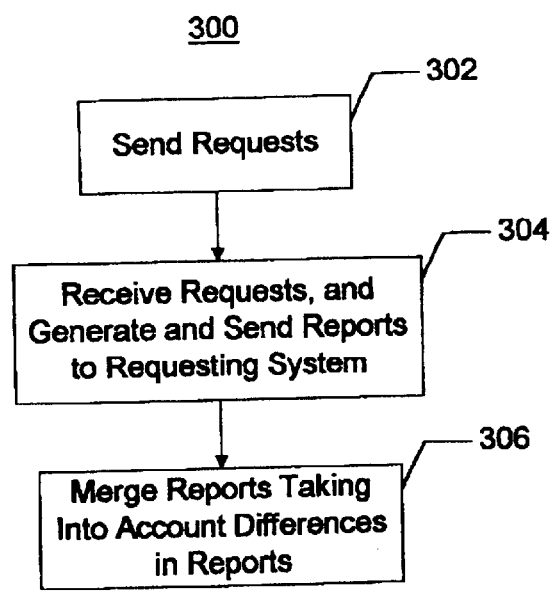
FIG. 7A is a high level flow chart depicting one embodiment of a method for merging reports in accordance with the present invention.

The reports 252, 254, and 256 can also be merged by the user on the requesting system 10. FIG. 7A depicts one embodiment of a method 300 for merging the reports 252, 254, and 256 in accordance with the present invention. The user sends the request 120 to the selected systems 22, 26, and 26 via step 302. The selected systems 22, 24, and 26 then generate and send the reports 252, 254, and 256, respectively, to the requesting system 10 via step 304. The requesting system 10 then merges the reports 252, 254, and 256 via step 306. While merging the reports 252, 254, and 256 in step 306, differences between the reports 252, 254, and 256 may be accounted for. In one embodiment, this is accomplished by ensuring that the reports 252, 254, and 256 are sufficiently similar to be merged. Reports 252, 254, and 256 may be different when the reports 252, 254, and 256 are generated in response to different requests 120 or when certain monitors 122 do not exist on one or more of the systems 22, 24, and 26 generating the reports 252, 254, and 256, respectively.

Figure 7B:
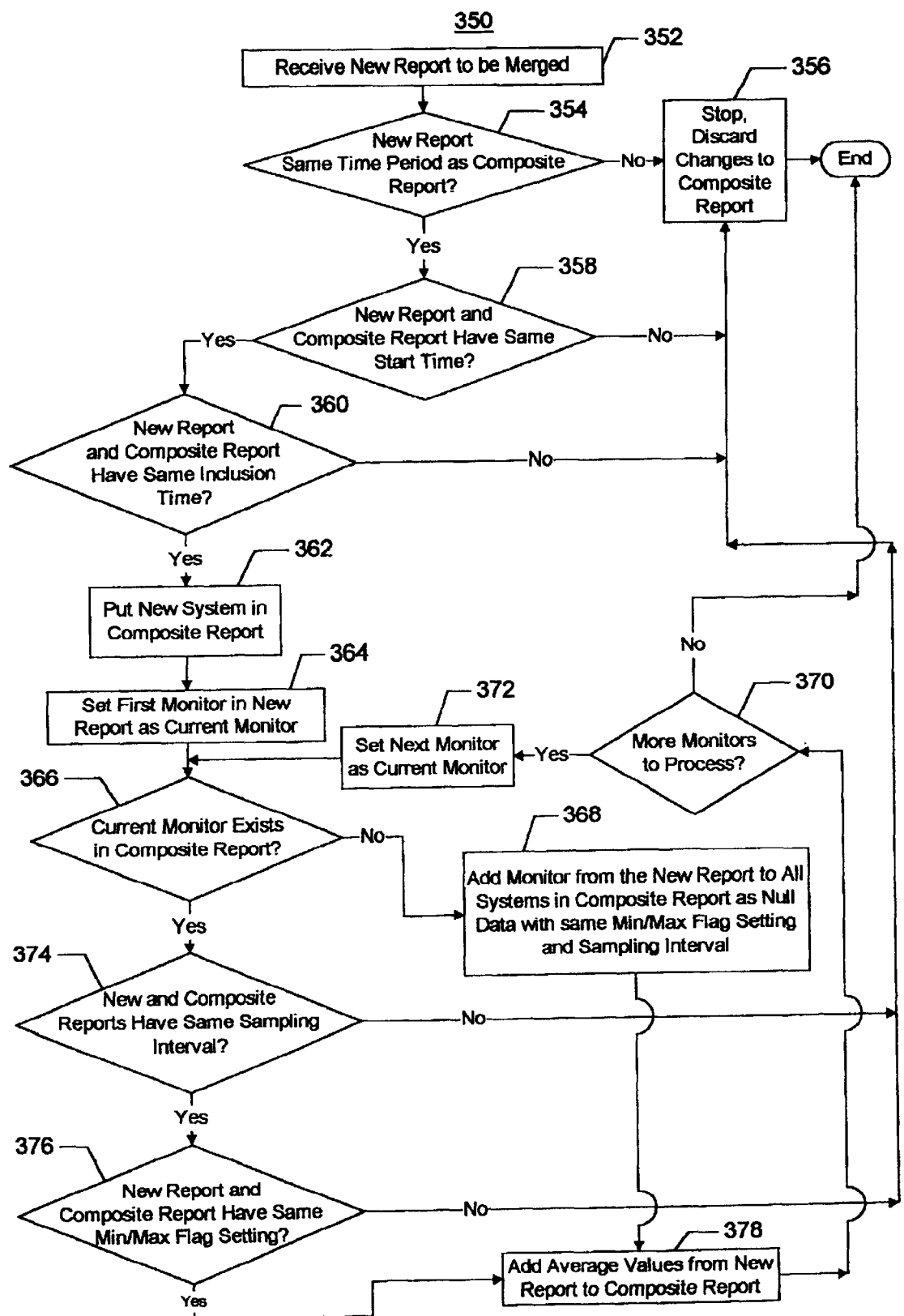
FIG. 7B is a more detailed flow chart of one embodiment of a method for merging reports in accordance with the present invention.

FIG. 7B depicts a more detailed flow chart of one embodiment of a method 350 for merging the reports 252, 254, and 256. A report to be merged ("new report") of the reports 252, 254, and 256 is received via step 352. In one embodiment, the new report may be selected from the reports 252, 254, and 256 in step 352. It is then determined if the new report has the same time period 128 as a composite report to be generated via step 354. The composite report could include any reports 252, 254, or 256 previously received and merged. If the new report is the first report, the composite report could be empty. In such a case, the new report will preferably become the composite report.

If the new report does not have the same time period 128 as the composite report, then the merging process is stopped via step 356 and any changes to the composite report may be discarded. If, however, the new report has the same time period 128 as the composite report, then it is determined in step 358 whether the new report has the same start time as the composite report. If the start time of the new report is different from that of the composite report, then via step 356 the merging process is stopped and any changes to the composite report are discarded. Thus, in one embodiment the new report and the composite report cover the same time period 128 and were generated at approximately the same time.

If the new report has the same start time as the composite report, then it is determined via step 360 if the inclusion times 130 for the new report are the same as for the composite report. If the inclusion times are not the same, then the merging process is terminated via step 356 and any changes to the composite report are discarded. Thus, via steps 354, 358, and 360 it is determined if the new report is sufficiently similar to the reports already in the composite report to be merged. Note, however, that in another embodiment, different or fewer criteria could be used to determine if the new report and the reports in the composite report are sufficiently similar to be merged. In addition, in a preferred embodiment, differences between the reports 252, 254, and 256 are accounted for in a different manner and do not prevent the reports 252, 254, and 256 from being merged.

If it is determined in step 360 that the new report has the same inclusion times as the composite report, then the new system 22, 24, or 26 which generated the new report is added to the composite report via step 362. The first monitor for the new report is then retrieved and made the current monitor via step 364. It is determined whether the current monitor for the new report exists in the composite report via step 366.

If the current monitor does not exist in the composite report, then via step 368 the current monitor is added to all the selected systems 22, 24, or 26 already listed in the composite report. The sampling interval and minimum/maximum flags 126 for the current monitor are also added to all the selected systems 22, 24, or 26 already listed in the composite report. However, null data is provided for the current monitor added to all the systems 10, 22, 24, 26, or 28 already listed in the composite report. The average values for the current monitor from the new report are then added to the composite report via step 378.

If it is determined in step 366 that the current monitor from the new report exists in the composite report, then via step 374 it is determined whether the current monitor from the new report has the same sampling interval 124 as for the monitor in the composite report. If it is determined that the sampling interval 124 is not the same, then via step 356 the merging process is stopped and any changes to the composite report are discarded.

If it is determined that the current monitor has the same sampling interval 124 as the monitor in the composite report, then via step 376 it is determined if the current monitor and the monitor in the composite report have similar requests for the minimum and maximum values. In one embodiment, step 376 is performed by determining if the current monitor and the monitor in the composite report have the same setting for the minimum/maximum flag 126. If it is determined that the settings for the minimum/maximum flags 126 are not the same, then merging process is terminated via step 356.

If it is determined via step 376 that the current monitor has the same minimum/maximum flag 126 setting as the monitor in the composite report then the average values from the new report are added to the composite report via step 378. It is then determined whether there are more monitors to process via step 370. If there are more monitors, then the next monitor is retrieved and made the new monitor via step 372. The method then continues until all of the monitors for the new report are processed. Once it is determined via step 370 that there are no more monitors to process, then the methods 350 ends. Thus, a composite report is generated.

When reports 252, 254, and 256 are merged using the method 350, reports 252, 254, and 256 having dissimilar properties such as inclusion time 130 are discarded. However, in a preferred embodiment, the present invention takes dissimilar properties into account when merging the reports 252, 254, and 256. Referring back to FIG. 7A, in a preferred embodiment, when the time period 128 or the start time differ, null data may be created in step 306 for some systems in order to account for the difference. When the sampling intervals 124 differ, the longest sampling interval 124 is preferably used in step 306. Average values for monitors 122 having a shorter sampling interval are preferably averaged to provide average values at the longest sampling interval 124 in the merging step 306 of a preferred embodiment. If settings for the minimum/maximum flag 126 differ for a particular monitor 122, then in step 306 of a preferred embodiment null data for the minimum values and maximum values will be created for the monitor 122 having the minimum/maximum flag set as off. Thus, in a preferred embodiment, reports 252, 254, and 256 having different properties can be merged and the differences between the reports 252, 254, and 256 accounted for.

Figure 8A:
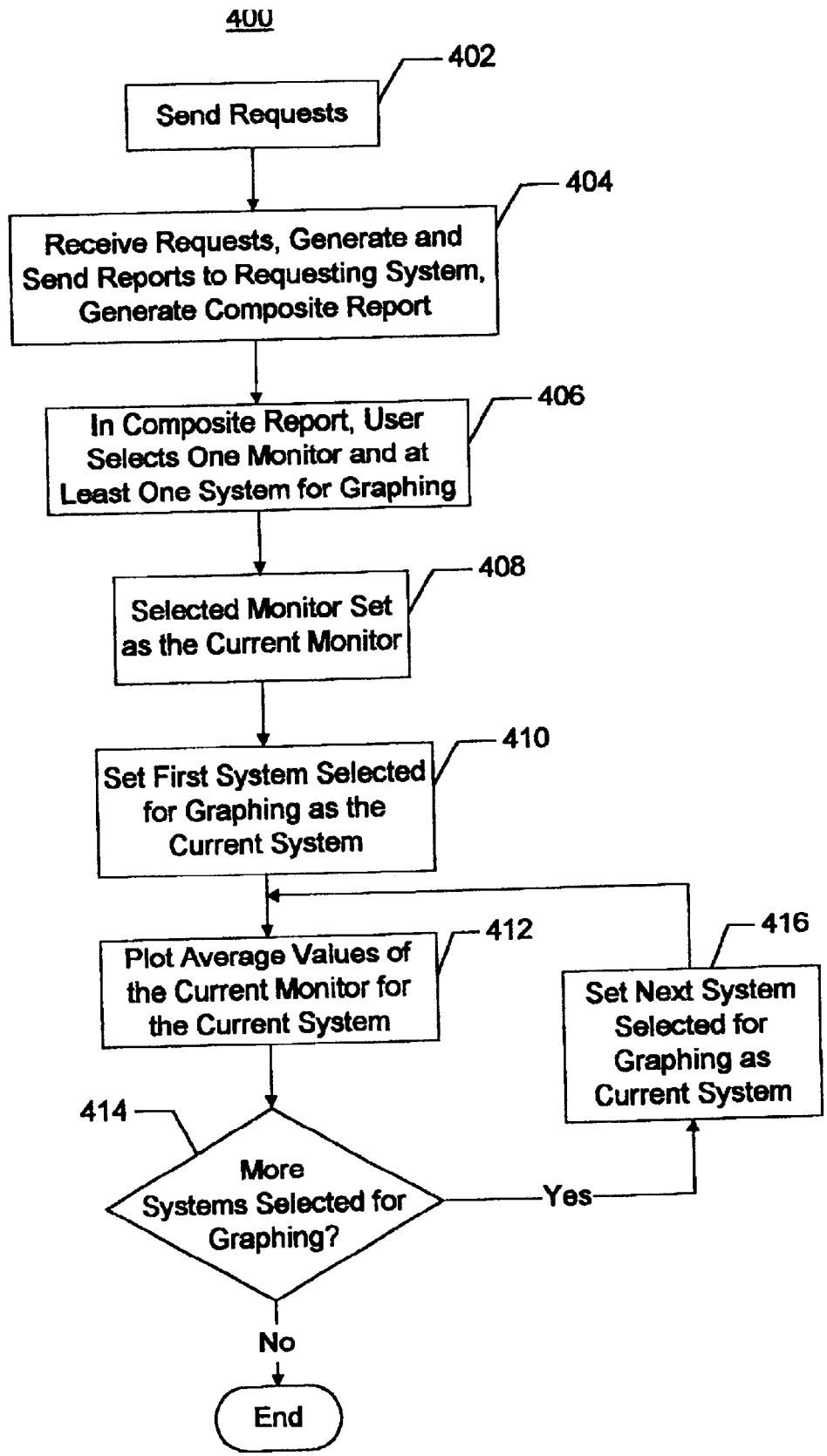
FIG. 8A is a high level flow chart depicting one embodiment of a method for graphically displaying performance data in accordance with the present invention.

In addition to merging the reports 252, 254, and 256, data for the reports can also be graphically displayed. FIG. 8A depicts a high level flow chart of a method 400 for generating a graphical display from a composite report including reports 252, 254, and 256. In a preferred embodiment, performance data is graphed from reports 252, 254, and 256 that are merged in the composite report. However, nothing prevents the method and system from graphing performance data from a plurality of reports 252, 254, and 256 which have not been merged.

Requests 120 are sent to the systems 22, 24, and 26 via step 402. For ease of explanation, the systems 22, 24, and 26 are assumed to have received the requests 120. However, nothing prevents the method 400 from being used when other systems 10, 22, 24, 26, or 28 are chosen. The reports 252, 254, and 256 are generated in response to the requests 120, returned to the requesting system 10 and merged into a composite report via step 404. Thus, steps 402 and 404 are preliminary steps performed at some time prior to a user requesting that performance data be graphed.

Via step 406, the user then selects one monitor 122 and at least one system 22, 24, or 26 from the composite report for which performance data is to be graphed. Thus, in a preferred embodiment, one monitor 122 is to be graphically displayed using the method 400. However, in another embodiment, the user may select more than one monitor 122 for display.

The monitor 122 the user has selected for graphing is then set as the current monitor via step 408. The first system 22, 24, or 26 the user has chosen for graphing is set as the current system via step 410. The average values of the current monitor for the current system are plotted via step 412. In one embodiment, the minimum values and maximum values of the current monitor are also plotted via step 412. In a preferred embodiment, the step 412 only plots minimum and maximum values for a monitor if there is only one system 22, 24, or 26 selected as having data to be graphically displayed. If inclusion times 130 have been specified, then in step 410 no data is plotted outside of the inclusion times 130. In an alternate embodiment, the average values, minimum values, and maximum values for different monitors 122 are plotted in step 412 so that when a user views data for monitors 122 having different sampling intervals, the plots displayed have different resolutions.

It is then determined via step 414 whether the user has selected more systems 22, 24, or 26 for graphing. If the user has not selected additional systems 22, 24, or 26 be graphed, then the method 400 ends. If, however, performance data for more systems 22, 24, or 26 is to be graphed, then via step 416, the next system 22, 24, or 26 is set as the current system. This process continues until the average values of the current monitor for all of the systems 22, 24, or 26 the user has selected for graphing have been plotted.

Figure 8B:
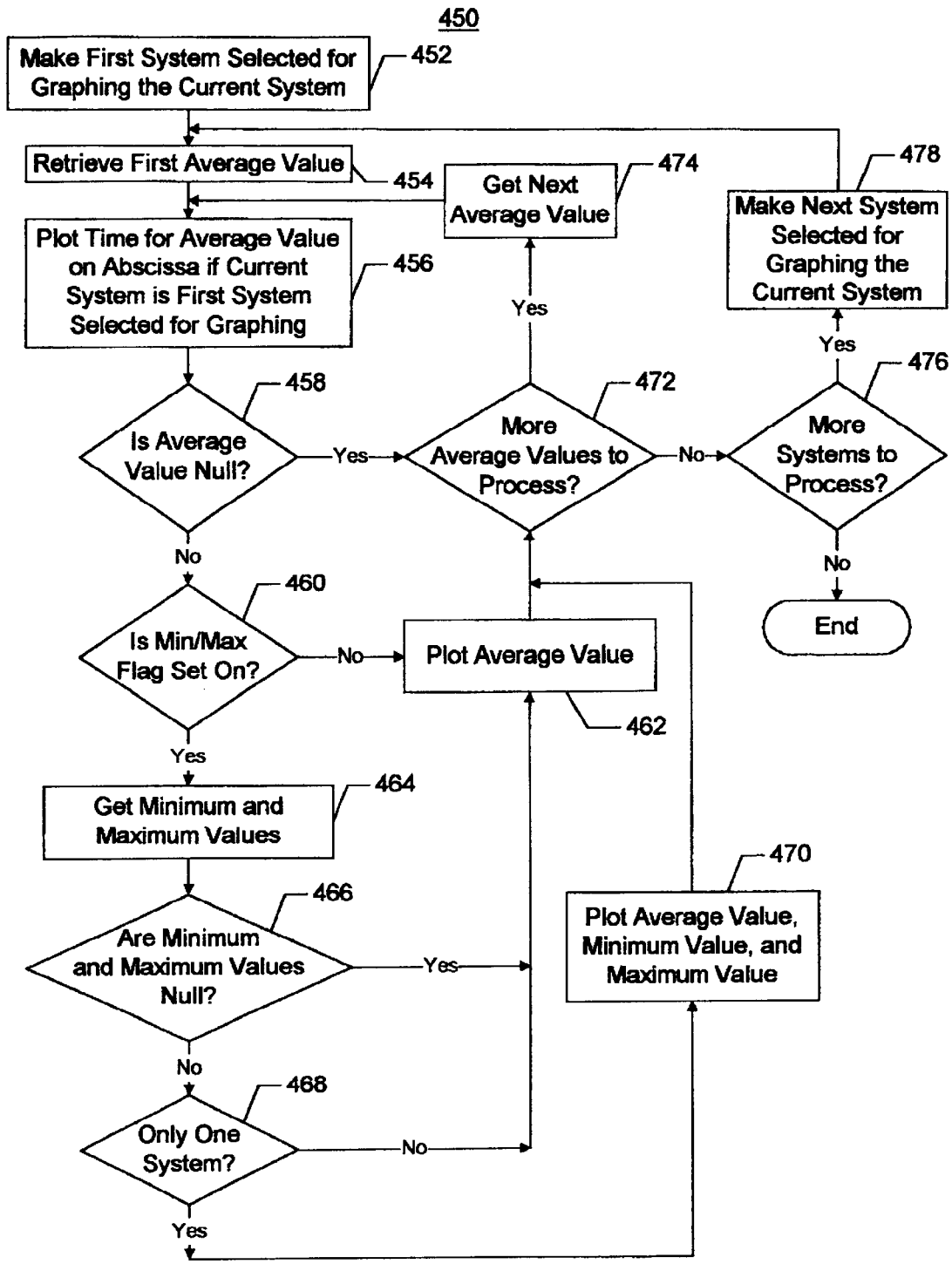
FIG. 8B is a more detailed flow chart of one embodiment of a method for graphically displaying performance data in accordance with the present invention.

FIG. 8B depicts a more detailed flow chart of a method 450 for graphically displaying data for a particular monitor 122 in accordance with the present invention. The first system 22, 24, or 26 the user has selected for graphing is set as the current system via step 452. The first average value for the current system is then retrieved via step 454. If the current system is also the first system 22, 24, or 26 selected to have its performance data graphically displayed, then the time for this average value is then plotted on the abscissa via step 456. Consequently, step 456 is preferably performed only for the first system 22, 24, or 26 for which performance data is graphed. It is then determined if the average value is a null value in step 458. The average value might be a null value when the composite report generated null data because the monitor 122 did not exist on the selected system 22, 24, or 26.

If it is determined that the average value is a null value, then in step 472 it is determined whether there are more average values to process. Step 472 will be further discussed below. If it is determined in step 458 that the average value is not a null value, then it is determined whether the minimum/maximum flag 126 is set as on via step 460. If the minimum/maximum flag 126 is not set as on then via step 462 the average value is plotted versus the corresponding time. Step 472, discussed below, is then performed.

If it is determined in step 460 that the minimum/maximum flag 126 is set as on, then the minimum value and maximum value corresponding to the average value are retrieved via step 464. It is determined via step 466 whether the minimum value and maximum value are null data via step 466. If the minimum value and maximum value are null then via step 462 the average value is plotted versus the corresponding time. If, however, the minimum value and maximum value are not null, then it is determined whether there is only one system 22, 24, or 26 selected to have its performance data plotted, via step 468. If there is not only one selected system 22, 24, or 26 having data to be plotted, then via step 462 the average value is plotted versus the corresponding time. Thus, in a preferred embodiment, if more than one selected system 22, 24, or 26 has data to be graphically displayed, then the minimum value and maximum value are not plotted. If it is determined in step 468 that there is only one system 22, 24, or 26 having data to be plotted then via step 470 the average value, minimum value, and maximum value are plotted versus the corresponding time.

Once the average value is plotted in step 462 or the average value, minimum value, and maximum values are plotted in step 470, then it is determined whether there are more average values to process via step 472. If there are more average values, then the next average value is retrieved via step 474. Steps 456 through 474 are repeated until it is determined in step 472 that there are no average values left to process for the monitor 122 selected for graphing for the current system.

If it is determined in step 472 that there are no more average values to process, then via step 476 it is determined whether there are more systems 22, 24, or 26 selected for graphing. If there are more system 22, 24 or 26 selected for graphing, then the next system 22, 24, or 26 is set as the current system via step 478. Steps 452 through 478 are then repeated until the performance data for all of the selected systems 22, 24, or 26 having data to be graphically displayed has been plotted. When it is determined that there are no more systems 22, 24, or 26 selected for graphing, the method 450 ends.

Thus, average values and, under certain conditions, minimum values and maximum values for monitors 122 for selected systems 22, 24, or 26 can be graphically displayed. In a preferred embodiment, the present invention takes inclusion times 130 into account by showing the time for each value is step 456 instead of assuming a series of consecutive times. As a result, no data is depicted for times not within the inclusion times 130.

Figure 9A:
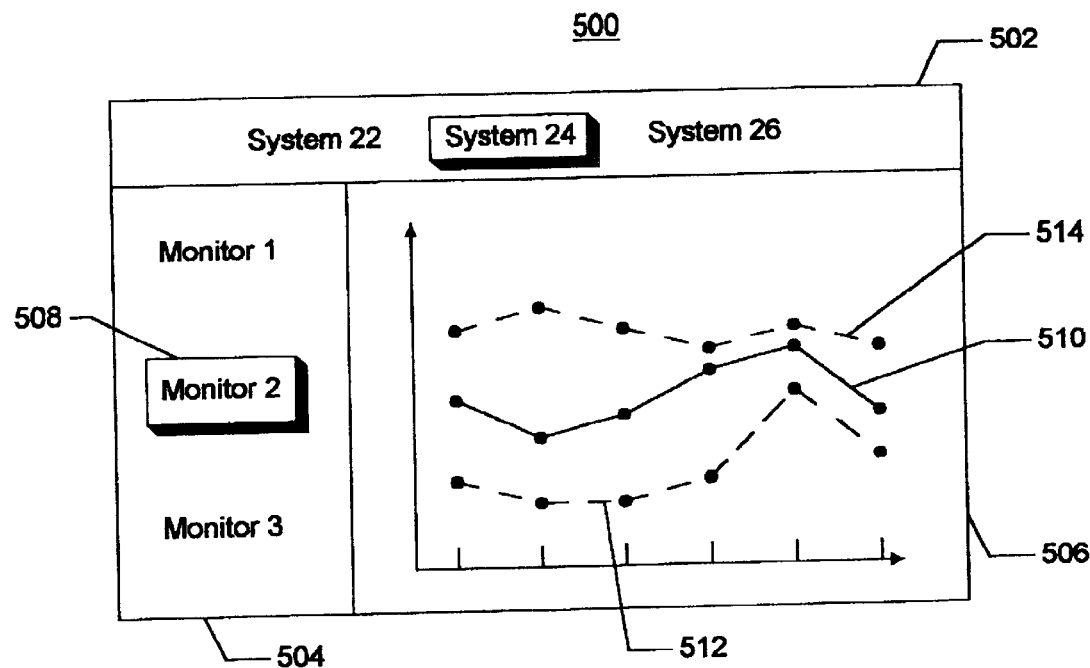
FIG. 9A is a block diagram of one embodiment of a graph of performance data for one system generated in accordance with the present invention.
Figure 9B:
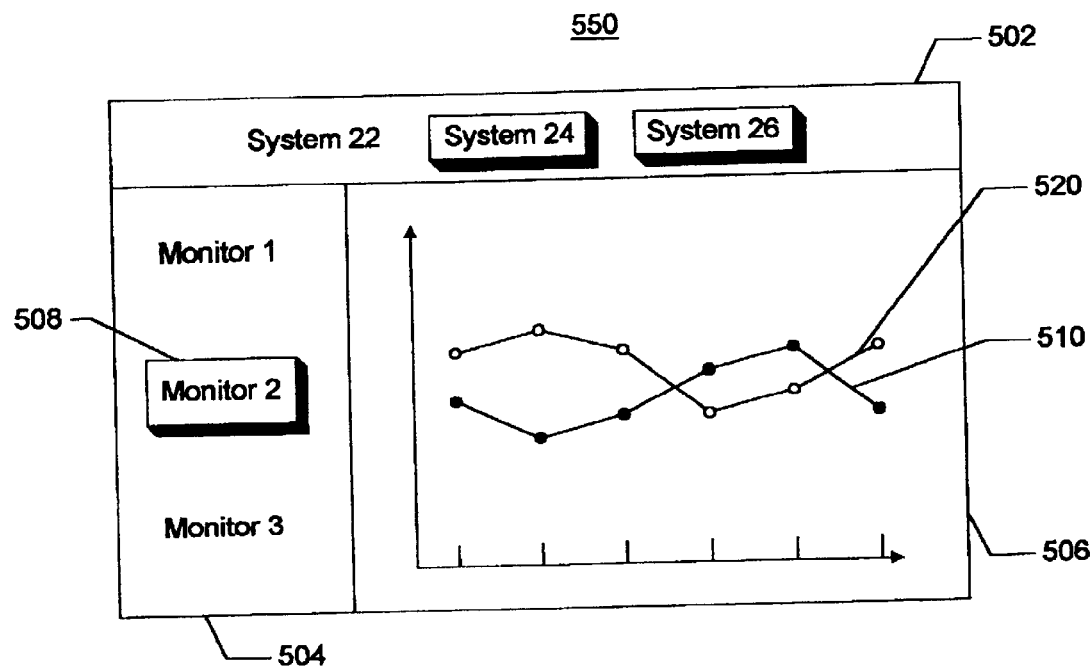
FIG. 9B is a block diagram of one embodiment of a graph of performance data for two systems generated in accordance with the present invention.

FIGS. 9A and 9B depicts performance data displayed on the display 18 in accordance with one embodiment of the present invention. Note, however, that in other embodiments, the graphs may appear different. In addition, in other embodiments, different information may be provided in the graphs. For example, the systems 22, 24, and 26 in the composite may be displayed differently or not displayed at all. Similarly, the monitors 122 may be displayed differently or not displayed.

Referring to FIG. 9A, a window 500 graphically displays data for a single system 24 in which the minimum/maximum flag 126 is set as on. The window 500 includes sections 502, 504, and 506. Section 502 lists the systems 22, 24, and 26 having data in the composite report and highlights the system 24 for which data is graphically displayed. Section 504 lists the monitors 122 for which performance data is saved in the composite report. The monitor 508 (Monitor 2) having data graphically displayed in the window 500 is highlighted. Section 506 graphically displays data for the monitor 508. Three plots 510, 512, and 514 are depicted. The first plot 510 shows the average value of the monitor 508 for the time period 128 requested. The plot 512 shows the minimum values of the monitor 508 for the time period 128 requested. The plot 514 shows the maximum values of the monitor 508 for the time period 128 requested. For each plot 510, 512, and 514, data is plotted at sampling intervals 124 within the time period 128 and the inclusion times 130. Consequently, a user can view data for a system 22, 24, or 26 having performance data saved in the composite report.

Referring to FIG. 9B, a window 550 graphically displays data for two systems 24 and 26. Although plots for two systems 24 and 26 are depicted in FIG. 9B, nothing prevents another number of systems 22, 24, and 26 from being graphically displayed. The window 500 also includes sections 502, 504, and 506. Section 502 lists the systems 22, 24, and 26 having data in the composite report and highlights the systems 24 and 26 for which data is graphically displayed. Section 504 lists the monitors 122 for which performance data is saved in the composite report. The monitor 508 (Monitor 2) having data graphically displayed in the window 500 is highlighted. Section 506 graphically displays data for the monitor 508. Two plots 510 and 520 are depicted. The first plot 510 shows the average value of the monitor 508 for the time period 128 requested for the system 24. The second plot 520 shows the average value of the monitor 508 for the time period 128 requested for the system 26. For each plot 510 and 520, data is plotted at sampling intervals 124 within the time period 128 and the inclusion times 130. Consequently, the user can rapidly view trends in performance of systems 22, 24, and 26 having data in the composite report.

Thus, the present invention allows a user to formulate the request 120 capable of having additional information such as sampling intervals 124, minimum/maximum data flags 126, and inclusion times 130. In response to receiving the request 120, a selected system 22, 24, or 26 generates a report 252, 254, or 256, respectively. In order to generate the report 252, 254, or 256, average values are calculated at the sampling intervals 124 and saved in the report 252, 254, or 256. In addition, only data occurring within the inclusion times 130 are saved. Moreover, minimum values and maximum values may also be saved in the report 252, 254, or 256. Consequently, the reports 252, 254, or 256 may be significantly smaller than a conventional report 30.

Because the reports 252, 254, or 256 may be significantly smaller, generating and sending reports 252, 254, or 256 to the requesting system 10 can take significantly less time and consume significantly less resources of the network 20. In addition, the reports 252, 254, and 256 may require less memory when stored on the requesting system 10. Moreover, important data such as minimum values and maximum values may not be lost.

The present invention also allows reports 252, 254, and 256 to be merged into a composite report and graphically displayed. When the reports 252, 254, or 256 are merged, differences in the reports are accounted for. In one embodiment, these differences are accounted for by discarding data for reports which are different from the composite report. However, in another embodiment, data may be generated, averaged, or otherwise manipulated in order to account for differences in the reports 252, 254, or 256. The performance data in the composite report can also be graphically displayed. The average values of monitors 122 for selected systems 22, 24, and 26 can be plotted on the same graph. Under certain conditions, the minimum values and maximum values are also plotted. Consequently, data in the composite can be graphically displayed.

A method and system has been disclosed for reducing the size of a report which provides performance data. In another aspect, the method and system merge reports of performance data and graphically display performance data. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing a user to request data relating to performance of a network including at least one system comprising the steps of:
   (a) selecting the at least one system from which data is requested;
   (b) identifying at least one data type for which data is requested;
   (c) selecting a sampling interval for sampling data for the at least one data type;
   (d) identifying a time period for which data of the at least one data type is requested; and
   (e) identifying an inclusion time, the inclusion time specifying at least one interval within the time period for which data for the at least one data type is sampled.

2. The method of claim 1 further comprising the step of:
   (f) requesting that a minimum value and a maximum value of the at least one data type are provided.

3. The method of claim 2 wherein the at least one data type includes at least one monitor indicating a performance characteristic of the at least one selected system.

4. A method for providing data relating to performance of at least one selected system in a network, the method comprising the steps of:
   (a) receiving a request by the at least one selected system, the request including a sampling interval, a time period indicating a total time for which data is to be provided, and at least one data type for which data is to be provided for the at least one selected system;
   (a1) storing values for data types in a local storage provided in the at least one selected system:
   (b) retrieving from said local storage at least one value for the at least one data type if the at least one data type is available on the at least one selected system;
   (c) calculating an average value for the sampling interval using the at least one value for the sampling interval;
   (d) saving the average value for the sampling interval in a report; and
   (e) repeating steps (b), (c), and (d) for each sampling interval in the time period.

5. The method of claim 4 wherein the request further includes an inclusion time specifying at least one interval within the time period for which data for the at least one data type is sampled and wherein the method further includes the steps of:
   (f) determining whether the at least one value is within the inclusion time; and
   (g) only performing steps (b), (c), (d), and (e) if the at least one value is within the inclusion time.

6. The method of claim 5 wherein the request further includes a minimum/maximum data request for the at least one data type, the method further comprising the steps of:
   (h) saving a minimum value and a maximum value of the at least one data type in the report if the request includes a minimum/maximum data request.

7. The method of claim 6 wherein the at least one data type includes at least one monitor indicating a performance characteristic of the at least one selected system.

8. A method for providing data relating to performance of at least one selected system network comprising the steps of:
   (a) allowing a user to formulate a request for the at least one selected system in the network from which data is requested, the request identifying at least one data type for which data is requested, selecting a sampling interval for sampling data for the at least one data type, and identifying a time period for which data of the at least one data type is to be collected;
   (b) receiving the request by the at least one selected system;
   (b1) storing values for data types in a local storage provided in the at least one selected system;
   (c) retrieving from said local storage at least one value for the at least one data type if the at least one data type is available on the at least one selected system;

(d) calculating an average value for the sampling interval using the at least one value for the sampling interval for the at least one selected system;

(e) saving the average value for the sampling interval in a report for the at least one selected system; and (f) repeating steps (c), (d), and (e) for each sampling interval in the time period for the at least one selected system.

9. The method of claim 8 wherein the step of allowing the user to formulate a request (a) further includes the step of:

(a1) allowing the user to formulate the request which further specifies an inclusion time specifying at least one interval within the time period for which data for the at least one data type is sampled.

10. The method of claim 9 further comprising the steps of:

(g) determining whether the at least one value is within the inclusion time for the at least one selected system; and (h) only performing steps (c), (d), (e) and (f) if the at least one value is within the inclusion time for the at least one selected system.

11. The method of claim 10 wherein the step of allowing the user to formulate the request (a) further includes the step of:

(a2) allowing the user to formulate the request further including a minimum/maximum data request for the at least one data type.

12. The method of claim 11 further comprising the step of:

(i) saving a minimum value and a maximum value of the at least one data type in the report for the at least one selected system if the request includes a minimum/maximum data request.

13. A method for providing a report for a portion of a plurality of systems on a network, the method comprising the steps of:

(a) providing plurality of requests to the portion of the plurality of systems, each of the plurality of requests identifying at least one data type for which data is requested, selecting a sampling interval for sampling data for the at least one data type, and identifying a time period for which data of the at least one data type;

(b) providing a report from each of the portion of the plurality of systems in response to a corresponding request of the plurality of requests, the report including data for the at least one data type, the data for the time period, and including at least one average value for each sampling interval within the time period, the report capable of having at least one difference from at least one other report from at least one other system of the portion of the plurality of systems; and (c) merging the report for each of the portion of the plurality of systems and accounting for the at least one difference to provide a composite report.

14. The method of claim 13 further comprising the step of:

(d) merging the report for each of the portion of the plurality of systems only if the sampling interval and the time period for the report for each of the portion of the plurality of systems is the same.

15. The method of claim 14 wherein each of the plurality of requests further includes an inclusion time specifying at least one interval within the time period for which data for the at least one data type is sampled, the method further comprising the step of:

(e) merging the report for each of the portion of the plurality of systems only if the inclusion time for each of the portion of the plurality of systems is the same.

16. The method of claim 15 wherein each of the plurality requests further can include a minimum/maximum data request, the method further comprising the step of:

(f) merging the report for each of the portion of the plurality of systems only if the plurality of requests for each of the portion of the plurality of systems all include the minimum/maximum data request or if the request for each of the portion of the plurality of systems all do not include the minimum/maximum data request.

17. The method of claim 13 wherein each of the plurality of requests further includes an inclusion time specifying at least one interval within the time period for which data for the at least one data type is sampled, the method further comprising the step of:

(e) generating null data for a particular report of the plurality of reports if the time period for the corresponding request of the plurality of requests is less a particular time period for another request of the plurality of requests.

18. The method of claim 13 wherein each of the plurality requests further can include a minimum/maximum data request, the method further comprising the step of:

(e) generating null data for a particular report of the plurality of reports if the corresponding request of the plurality of requests does not include the minimum/maximum data request and another request of the plurality of requests does include the minimum/maximum data request.

19. The method of claim 13 the method further comprising the step of:

(e) averaging the data for a particular report of the plurality of reports if the sample interval for a corresponding request of the plurality of requests is different from the sample interval of another request of the plurality of requests.

20. A method for graphically displaying data for at least one data type for a portion of a plurality of systems on a network, the method comprising the steps of:

(a) providing plurality of requests to the portion of the plurality of systems, each of the plurality of requests identifying at least one data type for which data is requested, selecting a sampling interval for sampling data for the at least one data type, and identifying a time period for which data of the at least one data type is to be collected;

(b) providing a report from each of the portion of the plurality of systems, the report including data for the at least one data type, the data for the time period and including at least one average value for each sampling interval within the time period; and (c) plotting the at least one average value for the at least one data type of each of the portion of the plurality of systems.

21. The method of claim 20 further comprising the step of:

(d) generating a composite report from the report from each of the portion of the plurality of systems prior to plotting the at least one average value for the at least one data type of each of the portion of the plurality of systems;

wherein the average value plotted is retrieved from the composite report.

22. The method of claim 21 wherein each of the plurality requests further can include a minimum/maximum data request, and wherein the report from each of the portion of the plurality of systems includes a minimum value and a maximum value for the time period if the minimum/maximum data request was made for the system of the plurality of systems, the method further comprising the step of:

(d) plotting the minimum value and the maximum value for each of the portion of the plurality of systems if the minimum/maximum data request was made for the system of the plurality of systems and if the portion of the plurality of systems includes only one system.

23. A computer-readable medium containing a program for allowing a user to request data relating to performance of a network including at least one system, the program comprising instructions for:

(a) selecting the at least one system from which data is requested;

(b) identifying at least one data type for which data is requested;

(c) selecting a sampling interval for sampling data for the at least one data type;

(d) identifying a time period for which data of the at least one data type is requested;

(e) identifying an inclusion time, the inclusion time specifying at least one interval within the period for which data for the at least one data type is sampled.

24. The computer-readable medium of claim 23 wherein the program further includes instructions for:

(f) requesting that a minimum value and a maximum value of the at least one data type are provided.

25. The method of claim 24 wherein the at least one data type includes at least one monitor indicating a performance characteristic of the at least one selected system.

26. A computer-readable medium containing a program for providing data relating to performance of at least one selected system in a network, the program including instructions for:

(a) receiving a request by the at least one selected system, the request including a sampling interval, a time period indicating a total time for which data is to be provided, at least one data type for which data is to be provided for the at least one selected system and an inclusion time specifying at least one interval within the time period for which data for the at least one data type is sampled;

(b) retrieving at least one value for the at least one data type if the at least one data type is available on the at least one selected system;

(c) calculating an average value for the sampling interval using the at least one value for the sampling interval;

(d) saving the average value for the sampling interval in a report; and (e) repeating instructions (b), (c), and (d) for each sampling interval in the time period.

27. The computer-readable medium of claim 26 wherein the request further includes instructions for:

(f) determining whether the at least one value is within the inclusion time; and (g) only performing instructions (b), (c), (d), and (e) if the at least one value is within the inclusion time.

28. The computer-readable medium of claim 27 wherein the request further includes a minimum/maximum data request for the at least one data type, and wherein the program further includes instructions for:

(h) saving a minimum value and a maximum value of the at least one data type in the report if the request includes a minimum/maximum data request.

29. The computer-readable medium of claim 28 wherein the at least one data type includes at least one monitor indicating a performance characteristic of the at least one selected system.

30. A computer-readable medium containing a program for providing data relating to performance of at least one selected system network, the program including instructions for:

(a) allowing a user to formulate a request for the at least one selected system in the network from which data is requested, the request identifying at least one data type for which data is requested, selecting a sampling interval for sampling data for the at least one data type, and identifying a time period for which data of the at least one data type an inclusion time specifying at least one interval within the time period for which data for the at least one data type is sampled;

(b) receiving the request by the at least one selected system;

(c) retrieving at least one value for the at least one data type if the at least one data type is available on the at least one selected system;

(d) calculating an average value for the sampling interval using the at least one value for the sampling interval for the at least one selected system;

(e) saving the average value for the sampling interval in a report for the at least one selected system; and (f) repeating instructions (c), (d), and (e) for each sampling interval in the time period for the at least one selected system.

31. The computer-readable medium of claim 30 wherein the program further includes instructions for:

(g) determining whether the at least one value is within the inclusion time for the at least one selected system; and (h) only performing instructions (c), (d), (e) and (f) if the at least one value is within the inclusion time for the at least one selected system.

32. The computer-readable medium of claim 31 wherein the instructions for allowing the user to formulate the request (a) further include instructions for:

(a1) allowing the user to formulate the request further including a minimum/maximum data request for the at least one data type.

33. The computer-readable medium of claim 32 wherein the program further includes instructions for:

(i) saving a minimum value and a maximum value of the at least one data type in the report for the at least one selected system if the request includes a minimum/maximum data request.

34. A computer-readable medium containing a program for providing a report for a portion of a plurality of systems on a network, the program including instructions for:

(a) providing plurality of requests to the portion of the plurality of systems, each of the plurality of requests identifying at least one data type for which data is requested, selecting a sampling interval for sampling data for the at least one data type, and identifying a time period for which data of the at least one data type;

(b) providing a report from each of the portion of the plurality of systems in response to a corresponding request of the plurality of requests, the report including data for the at least one data type, the data for the time period, and including at least one average value for each sampling interval within the time period, the report capable of having at least one difference from at least one other report from at least one other system of the portion of the plurality of systems; and (c) merging the report for each of the portion of the plurality of systems and accounting for the at least one difference to provide a composite report.

35. The computer-readable medium of claim 34 wherein the program further includes instructions for:

(d) merging the report for each of the portion of the plurality of systems only if the sampling interval and the time period for the report for each of the portion of the plurality of systems is the same.

36. The computer-readable medium of claim 35 wherein each of the plurality of requests further includes an inclusion time specifying at least one interval within the time period for which data for the at least one data type is sampled, and wherein the program further includes instructions for:

(e) merging the report for each of the portion of the plurality of systems only if the inclusion time for each of the portion of the plurality of systems is the same.

37. The computer-readable medium of claim 36 wherein each of the plurality requests further can include a minimum/maximum data request, and wherein the program further includes instruction for:

(f) merging the report for each of the portion of the plurality of systems only if the plurality of requests for each of the portion of the plurality of systems all include the minimum/maximum data request or if the request for each of the portion of the plurality of systems all do not include the minimum/maximum data request.

38. The computer-readable medium of claim 37 wherein each of the plurality of requests further includes an inclusion time specifying at least one interval within the time period for which data for the at least one data type is sampled, and wherein the program further includes instructions for:

(e) generating null data for a particular report of the plurality of reports if the time period for the corresponding request of the plurality of requests is less a particular time period for another request of the plurality of requests.

39. The computer-readable medium of claim 37 wherein each of the plurality requests further can include a minimum/maximum data request, and wherein the program further includes instructions for:

(e) generating null data for a particular report of the plurality of reports if the corresponding request of the plurality of requests does not include the minimum/maximum data request and another request of the plurality of requests does include the minimum/maximum data request.

40. The computer-readable medium of claim 37 wherein the program further includes instructions for:

(e) averaging the data for a particular report of the plurality of reports if the sample interval for a corresponding request of the plurality of requests is different from the sample interval of another request of the plurality of requests.

41. A computer-readable medium containing a program for graphically displaying data for at least one data type for a portion of a plurality of systems on a network, the program including instructions for:

(a) providing plurality of requests to the portion of the plurality of systems, each of the plurality of requests identifying at least one data type for which data is requested, selecting a sampling interval for sampling data for the at least one data type, and identifying a time period for which data of the at least one data type;

(b) providing a report from each of the portion of the plurality of systems, the report including data for the at least one data type, the data for the time period and including at least one average value for each sampling interval within the time period; and (c) plotting the at least one average value for the at least one data type of each of the portion of the plurality of systems.

42. The computer-readable medium of claim 41 wherein the program further includes instructions for:

(d) generating a composite report from the report from each of the portion of the plurality of systems prior to plotting the at least one average value for the at least one data type of each of the portion of the plurality of systems;

wherein the average value plotted is retrieved from the composite report.

43. The computer-readable medium of claim 41 wherein each of the plurality requests further can include a minimum/maximum data request, wherein the report from each of the portion of the plurality of systems includes a minimum value and a maximum value for the time period if the minimum/maximum data request was made for the system of the plurality of systems, and wherein the program further includes instructions for:

(e) plotting the minimum value and the maximum value for each of the portion of the plurality of systems if the minimum/maximum data request was made for the system of the plurality of systems and if the portion of the plurality of systems includes only one system.

44. A method comprising the acts of:

(a) using monitors in a system to collect performance data;

(b) storing and maintaining a historical record of the collected performance data in said system;

(c) receiving in said system a request for performance data report, said request including a performance data type;

a sampling interval to sample data for the performance data type and an inclusion time specifying at least one interval within the time period for which data for the at least one data type is to be sampled;

(d) preparing from the stored historical data a report containing information set forth in step (c); and (e) transmitting the report from said system.

* * * * *